United States Patent
Wiesmayer

(10) Patent No.: US 9,308,675 B2
(45) Date of Patent: Apr. 12, 2016

(54) SEALING SHELL AND USE THEREOF, DEVICE AND METHOD FOR PRODUCING FOAM-MOLDED PARTS

(76) Inventor: Otto Wiesmayer, Neustadt/Donau (DE)

( * ) Notice: Subject to any disclaimer, the term of this patent is extended or adjusted under 35 U.S.C. 154(b) by 381 days.

(21) Appl. No.: 13/816,533

(22) PCT Filed: Aug. 15, 2011

(86) PCT No.: PCT/DE2011/001589
§ 371 (c)(1),
(2), (4) Date: Apr. 17, 2013

(87) PCT Pub. No.: WO2012/025094
PCT Pub. Date: Mar. 1, 2012

(65) Prior Publication Data
US 2013/0210952 A1    Aug. 15, 2013

(30) Foreign Application Priority Data

Aug. 13, 2010  (DE) .......................... 10 2010 034 366
Dec. 3, 2010   (DE) .......................... 10 2010 053 228

(51) Int. Cl.
| | |
|---|---|
| B29C 33/00 | (2006.01) |
| B29C 33/10 | (2006.01) |
| B29C 33/18 | (2006.01) |
| B29C 33/40 | (2006.01) |
| B29C 33/56 | (2006.01) |
| B29C 44/34 | (2006.01) |
| B29C 44/58 | (2006.01) |

(52) U.S. Cl.
CPC ............ *B29C 33/0038* (2013.01); *B29C 33/40* (2013.01); *B29C 33/565* (2013.01); *B29C 44/351* (2013.01); *B29C 44/588* (2013.01); *B29C 33/10* (2013.01); *B29K 2821/003* (2013.01); *B29K 2823/04* (2013.01)

(58) Field of Classification Search
None
See application file for complete search history.

(56) References Cited

U.S. PATENT DOCUMENTS

| | | | | |
|---|---|---|---|---|
| 2,734,227 | A | * | 2/1956 | Costick et al. ........ B29C 44/351 425/218 |
| 3,464,872 | A | | 9/1969 | Everett |
| 4,447,372 | A | * | 5/1984 | Kreuttner ........................ 264/2.2 |
| 2005/0184420 | A1 | | 8/2005 | Biewer et al. |
| 2006/0198921 | A1 | | 9/2006 | Fujita |
| 2008/0258324 | A1 | * | 10/2008 | Tanaka ................... B29C 44/086 264/40.5 |
| 2012/0128909 | A1 | | 5/2012 | Wiesmayer |

FOREIGN PATENT DOCUMENTS

| | | |
|---|---|---|
| EP | 1 190 828 | 3/2002 |
| EP | 1 566 253 | 8/2005 |
| FR | 2 166 222 | 8/1973 |
| WO | WO 2010/139307 | 12/2010 |

OTHER PUBLICATIONS

International Search Report of PCT/DE2011/001589, Feb. 6, 2012.

* cited by examiner

*Primary Examiner* — Kara Boyle
(74) *Attorney, Agent, or Firm* — Collard & Roe, P.C.

(57) ABSTRACT

The invention proposes a sealing shell (101) for partially bounding and for sealing a cavity (111), the sealing shell having a foam mold side and a tool carrier side, wherein the sealing shell is made of a material that is compressed when the cavity is closed.

1 Claim, 1 Drawing Sheet

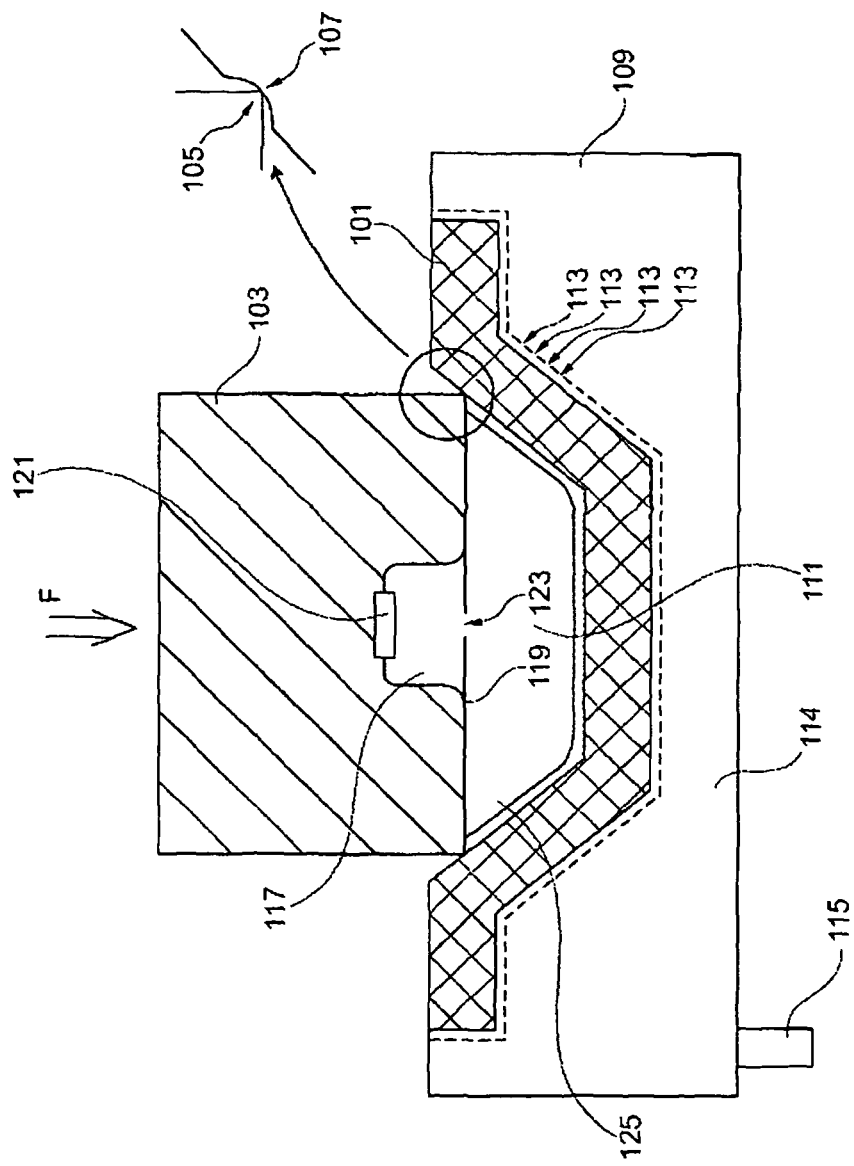

SEALING SHELL AND USE THEREOF, DEVICE AND METHOD FOR PRODUCING FOAM-MOLDED PARTS

CROSS REFERENCE TO RELATED APPLICATIONS

This application is the National Stage of PCT/DE2011/001589 filed on Aug. 15, 2011 which claims priority under 35 U.S.C. §119 of German Application No. 10 2010 034 366.8 filed on Aug. 13, 2010 and German Application No. 10 2010 053 228.2 filed on Dec. 3, 2010, the disclosures of which are incorporated by reference. The international application under PCT article 21(2) was not published in English.

The invention relates to a sealing shell for partially bounding and for sealing a cavity, said sealing shell having a foam mold side and a tool carrier side, to a method for producing a foam mold, and to the use of the sealing shell. Furthermore, the invention relates to a foam mold and to an associated foam mold tool and to a method for producing a foam mold, and to an associated foam mold.

In the manufacture of foam parts, among other things coatings are used in order to achieve a closed surface of the foam parts. In this process a coating, most of the time comprising polyurethane (PU), is introduced into the open lower part of the foam mold. Subsequently the foam is introduced and the foam tool is closed. The foam system homogeneously combines with the coating, and following a curing time the part is then removed from the mold. In the conventional manufacture of the parts, the coating combines with the foam mold tool, and for this reason a release agent needs to be applied to the mold tool prior to the foaming process.

Depending on the design of the foam part, the above can only take place in the lower part of the mold tool, or it can take place on both sides, in other words in the lower part of the foam mold and in the upper part of the foam mold. At the surface of the finished foam parts the release agent causes compromised quality, for example in the form of streaks, differences in gloss, release agent inclusions or similar.

After a relatively small number of parts, the release agent that has accumulated at each cycle in the foam tool needs to be removed in a cleaning process. This results in a large number of rejects and in considerable expenditure.

Similar considerations apply in the case of vehicle components, for example armrests, which are usually produced from a plastic inlay or plastic carrier and which in a defined region are combined with a foam. In this arrangement, most of the time foam components are produced in a front foam mold by means of a cavity in the lower part, wherein the front foam mold predominantly comprises aluminum.

Furthermore, the plastic carrier can be produced in that the plastic inlay or the plastic carrier is affixed in the upper part of the foam tool, and the upper part and the lower part are closed, wherein the foam system was predominantly introduced in the lower part. The foam system fills up the void, created by closing the lower part and the upper part, between the lower part of the mold tool and the carrier surface of the plastic inlay or of the plastic carrier. In this process the foam system homogeneously connects to the plastic inlay or to the plastic carrier.

Usually, the component produced in this manner is subsequently laminated. During laminating, for example a film or foil or leather is stretched over the foam region of the component and is connected to the component, for example by sewing.

The quality of the above-described components decisively depends on an invisible transition between the plastic carrier and the flexible foam after laminating.

Furthermore, foam systems have the characteristics, as a result of their expansion behavior, of penetrating even the minutest gaps between the carrier and the foam mold even at a size of less than 0.05 mm. This behavior is referred to as "foaming over". After production, residues from such foaming over need to be removed manually or by means of robot-assisted grinding tools or brushes.

In order to reduce such foaming over, the plastic inlay or the plastic carrier is made to contact the lower part of the mold tool in as defined a manner as possible. The act of establishing such contact is referred to as "touching". However, due to manufacturing tolerances of the plastic inlay or of the plastic carrier this contact does not result in a sealed cavity, and consequently, foaming-over continues to frequently take place.

It is not possible to press the plastic inlay or the plastic carrier on, because the sensitive lower parts of the mold tool would then be scratched or damaged, thus rendering them unusable.

As has already been explained, components comprising a plastic carrier and foam affixed to it are laminated. Depending on costs, haptic and visual characteristics, this can take place by means of a film or foil, a stretched plastic skin or leather. Each of these laminating materials can comprise a different thickness that results in different foam molds having to be used for different laminating materials.

It is the object of the invention to improve the state of the art.

According to a first aspect of the invention, this object is met by a sealing shell for partially bounding and for sealing a cavity, said sealing shell having a foam mold side and a tool carrier side, wherein the sealing shell is made from a material that is compressed when the cavity is closed.

Consequently a foam mold can be provided in which a plastic carrier or a plastic inlay presses itself somewhat into the sealing shell without mechanically or abrasively damaging said sealing shell.

Thus a circumferential closed contour can be created that prevents foaming over. In this manner a sealed cavity can be provided.

The following terms are explained:

A "sealing shell" forms a large-surface three-dimensional delimitation for a foam introduced into the cavity. The sealing shell is regularly affixed in a foam tool. The use of the sealing shell is advantageous in that the sealing shell is easy to produce and can quickly and economically be replaced in the case of damage.

The sealing shell can comprise foam-repellent characteristics so that in a preferred embodiment it is not necessary to use any release agents.

The basic manufacture, use of the sealing shell in a foam tool, and the release-agent-repellent production characteristics are set out in WO 2010 13 93 07 A1, wherein the content of said document forms part of the present application.

The term "partially bounding" refers to the propagation of a foam introduced into the cavity so that the shape of the sealing shell is reproduced by the introduced expanding foam.

The term "sealing a cavity" refers, in particular, to an outcome where foaming-over of the foam at the contact contour does not occur or is greatly reduced.

A "cavity" is a hollow space or a void that is filled by the introduced foam, and that shapes the foam in the form of the cavity itself.

The "foam mold side" of the sealing shell is the region of the sealing shell that can establish contact with the expanding foam.

The "tool carrier side" of the sealing shell is the part of the sealing shell that is in affixing contact with the foam tool.

The "compressible material" is designed in such a manner that, for example, when a plastic carrier is pressed on, the manufacturing tolerance of the plastic carrier is compensated for by compression of the material.

Selection of the material and of the necessary pressure for producing the sealed cavity is, in particular, determined in that different materials of different thicknesses with the maximum-permissible deviations in the tolerance of the plastic carrier are subjected to pressure so that no foaming-over of the foam used takes place. Thus the selection of the material, of the material thickness and of the pressure essentially takes place empirically.

In order to provide a defined structure or texture to the foam-molded part, on the foam mold side the sealing shell can comprise a grain, a smooth or a polished surface.

The term "grain" in the context of a surface refers to a surface that has been textured, for example to imitate a leather-like appearance. A grained surface can thus provide high haptic quality of the foam-molded part.

In a further embodiment the sealing shell can be manufactured by means of an injection molding method or by means of a deep-drawing method. Thus, large numbers of sealing shells can be produced at consistently high quality.

Preferably, sealing shells are manufactured that comprise a thickness that is accurately reproducible to one hundredth of a millimeter.

Furthermore, a surface comprising a grainy texture can be produced already by means of the manufacturing method of the sealing shell, rather than having to be imparted separately to the foam mold, for example by means of photo-etching.

In order to provide a material that is optimal for the sealing shell, the sealing shell can be manufactured from a material comprising a polyolefin, in particular a polyethylene, or a thermoplastic elastomer.

Polyolefins are polymers made from alkenes, such as ethylene, propylene, 1-butene or isobutene, by means of polymerization. Polyolefins are also referred to as polymerized alkenes or polyalkenes. Polyolefins comprise saturated hydrocarbons; they form partially crystalline thermoplastic materials that are, in particular, suited to the injection molding method. Polyolefins are characterized by good chemical resistance and good electrical insulation properties.

"Polyethylene" is a thermoplastic, produced by polymerization of ethylene $[CH_2=CH_2]$, with the simplified chain structure formula $[—H_2C—CH_2—]_n$.

Thermoplastic elastomers (TPEs) are plastics that at room temperature behave comparably to the classical elastomers; however, when heat is added they can be plastically deformed, thus displaying thermoplastic behavior. Thus, in particular by defined temperature-controlling, the compression behavior of the sealing shell can be influenced.

Thermoplastic elastomers are material in which elastic polymer chains are integrated in the thermoplastic material. However, they can also be processed in a purely physical process in combination with high shearing forces, the effect of heat, and subsequent cooling. Although, in contrast to elastomers, no chemical cross-linking by means of time-intensive and temperature-intensive vulcanization is necessary, because of their particular molecular structure the sealing shells produced have rubber-like characteristics.

In some regions thermoplastic elastomers have physical cross-links that dissolve under the influence of heat, without the macro-molecules decomposing. For this reason thermoplastic elastomers can be processed more easily than "normal elastomers". Thermoplastic elastomers include both block copolymers and elastomer blends. Block copolymers comprise hard segments and soft segments within a molecule. The plastic comprises a molecule type in which both characteristics are distributed.

Elastomer blends are classified as polyblends, in other words mixtures of finished polymers. Thus the plastic can comprise several molecule types. As a result of different mixing ratios and additions, tailor-made materials can be obtained. Examples of this include polyolefin elastomers comprising polypropylene and natural rubber, which, depending on their volume compositions, cover different hardness ranges. Thermoplastic elastomers include olefin-based thermoplastic elastomers (TPE-O); olefin-based cross-linked thermoplastic elastomers (TPE-V); urethane-based thermoplastic elastomers (TPE-U); thermoplastic polyester elastomers thermoplastic copolyesters (TPE-E); styrene block copolymers (TPE-S) (SBS, SEBS, SEPS, FEEPS and NBS), for example Septon made by the Kuraray company, and thermoplastic copolyamides (TPE-A).

To be able to impart a protective surface to the foam, the sealing shell is at least in some regions coated. Coatings of the type used in this application include, in particular, polyurethane-based coatings.

In a further embodiment a carrier, in particular a plastic carrier, or a tool half can be pressed onto the sealing shell so that a foam-tight contact contour forms.

Thus it is possible to provide a cavity for a foam, which foam on one side forms the sealing shell and on the other side establishes a firm contact with the carrier, or imparts the shape of the tool half to the foam. In particular, foaming-over beyond the contact contour is prevented.

In order to provide the advantages of the sealing shell also to a second tool half, the (second) tool half can comprise a (second) sealing shell, in particular a sealing shell as described above.

In particular, the second sealing shell can comprise a material composition that differs from that of a first sealing shell so that, for example, a harder sealing shell and a softer sealing shell can be joined to form a sealed cavity. It should be pointed out that in each case a sealing shell can be introduced into a tool half of the foam tool.

Since venting by way of the contact contour is not to take place, or is to take place only with difficulty, at least one of the sealing shells, the carrier, or one tool half can comprise a venting area in a non-visible region. The precise location of the venting area is regularly determined empirically.

In order to catch foamed-over material, one of the sealing shells, the carrier or the tool half can comprise a venting pot. Thus it can be ensured that foamed-over material from the cavity is placed in a defined manner in a venting pot.

Furthermore, the venting pot can comprise a sealing lip so that the venting area and thus the venting pot are hermetically sealed off, in a foam-proof manner, from the environment.

In a further embodiment of the invention the venting area can be designed so as to be semi-permeable so that a foam expanding in the cavity remains in the cavity, and air leaves the cavity by way of the semi-permeable venting area.

It is thus possible to reduce the incidence of air inclusions in the foam. Furthermore, the air in the cavity is not excessively compressed so that better quality in terms of the foam-molded parts can be ensured.

In order to implement as effectively and as easily implementable as possible an option of the semi-permeable venting area, the semi-permeable venting area can comprise a membrane permeable to vapor diffusion or a membrane comprising microperforations.

In this arrangement the "membrane permeable to vapor diffusion" can, in particular, be designed as a grid that at regular or irregular spacing comprises perforations. This can thus, for example, be a PE grid that comprises perforation apertures in the micro range or in the nano range.

The "microperforations" can, in particular, be created already in the process of manufacturing the sealing shell or can be provided by perforating the manufactured sealing shell. Both the microperforations and the grid apertures can be designed so as to be smaller than 0.05 mm, in particular smaller than 0.01 mm or smaller than 0.003 mm.

In a further embodiment the sealing shell is affixed on the tool carrier side to a foam tool so that a foam tool comprising a sealing shell is formed.

Thus a device can be provided by means of which foam-molded parts, in particular comprising a carrier and added foam, can be manufactured.

In order to ensure as simple and as effective as possible a mounting of the sealing shell in a foam tool, affixation can take place by means of a vacuum or mechanically.

In "mechanical affixation" both detachably attached or permanent connections are implementable. The options of attachment are not limited to screw-type means, adhesive means or clamping means.

In "affixation by means of a vacuum" a positive-locking receiving device for the sealing shell can be used, wherein several holes are arranged in the receiving device. A vacuum is generated behind these holes so that the sealing shell is pressed into the receiving device.

In a further aspect of the invention the object is met by a device for producing foam-molded parts, wherein a sealing shell as described above has been introduced. Thus a foam-molded part tool that implements already described advantages can be provided.

In an additional aspect of the invention the object is met by the use of a previously described sealing shell to compensate for differences in the thickness of foamed mold parts that are, for example, leather-laminated and foil-laminated or film-laminated. In this manner differences in thickness can be compensated for by the sealing shell.

Moreover, the hitherto-used pure liners are no longer necessary. A pure liner is an additional layer which has hitherto implemented thickness compensation. This arrangement was associated with a disadvantage in that the pure liner frequently remained in the component, and laminating took place around the pure liner. Such solutions are presently no longer necessary, and a high rate of production while meeting stringent requirements in terms of high quality can be provided.

In a further aspect the object is met by a foam mold comprising a semi-permeable venting area.

In this way, generally speaking, foam molds with an effective venting device can be provided. The advantages correspond to the previously described advantage in the case of semi-permeable venting areas in the sealing shell described above, wherein the application is not limited to sealing shells, but instead can be used in any foam tools.

In terms of a respective embodiment, the semi-permeable venting area can be formed by a membrane or by microperforations. In this context, too, reference is made to the characteristics and advantages described above.

Furthermore, the object can be met by a mold foam tool comprising a previously described mold foam mold. It is thus possible to provide mold foam tools of a high standard and of high quality.

In a further aspect of the invention the object is met by a method for producing a foam mold, wherein a previously described sealing shell is used, and in order to form a sealed cavity a counterpart of the sealing shell is pressed onto the sealing shell, and, before or after pressing-on, a foam is introduced into the cavity so that the sealed cavity forms and the foam introduced into the cavity expands only within the cavity.

In this arrangement the counterpart can be formed by a further sealing shell.

The material thickness, the material selection and the forces necessary for forming the sealed cavity are determined empirically.

In this manner foam molds and foam-molded parts of a high standard and of high quality can be provided.

In a further aspect of the invention the object is met by a foam-molded mold part that is produced according to the previously described method.

Furthermore, the invention is explained in more detail with reference to exemplary embodiments.

In this arrangement

FIG. 1 in a diagrammatic section view shows a foam tool with a plastic carrier introduced therein.

A tool for producing a foam-molded part is provided in that a sealing shell 101 has been introduced into a tool carrier half 109. The receiving device of the tool carrier half 109 comprises vacuum perforations 113. The tool carrier 109 comprises a void 114. A vacuum pump 115 is flanged to this void. By way of the vacuum in the tool holder cavity 114, which vacuum has been generated by the vacuum pump 115, by way of the vacuum holes 113 the sealing shell 101 is affixed in the tool carrier half 109.

The foam-molded part to be produced comprises a plastic carrier 103. On the side of the cavity the plastic carrier 103 comprises a vent hole 123 that leads from the cavity 111 to the venting pot 117. The venting pot 117 is firmly connected to the plastic carrier 103 by way of a sealing lip 119. Furthermore, the venting pot 117 comprises a semi-permeable membrane 121. This semi-permeable membrane 121 comprises GoreTex®. Thus, air can be conveyed from the cavity 111 to the venting pot 117 and can be removed by way of the membrane 121.

Before the foam-molded part can be produced, on the cavity side a polyurethane-based coating 125 is applied to the sealing shell 101. A foam is introduced into the cavity 111, which foam expands over time. Immediately after the introduction of the foam the plastic carrier is pressed at a defined force F in the direction of the arrow into the sealing shell 101.

In this process a contact contour forms at the contact points 105, 107. Because the plastic carrier edge 105 elastically deforms the contact edge of the sealing shell 107, a closed and foam-proof cavity 111 is provided. In this cavity 111 the previously introduced foam expands.

Since foaming-over beyond the contact contour is not possible, any excess foam reaches the venting pot 117. Furthermore, air is removed from the cavity 111 by way of the vent hole 123 and the membrane 121.

During foaming of the previously introduced foam the shape of the cavity 111 is imparted to the foam. In this arrangement the foam establishes a fixed connection both with the coating 125 and with the plastic carrier 103.

After completion of foaming the foam-molded part comprising the plastic carrier 103, the foamed foam and the coated coating 125 is de-molded.

As a result of the material selection of the sealing shell this de-molding takes place without any residues. This is followed by a further production of a foam-molded part. As an alternative, the closed cavity 111 is formed and the foam is then introduced.

To make it possible to laminate a foam-molded part with materials whose thickness differs, the thickness of the sealing shell 101 is selected in such a manner that the differences in the thickness of the laminating materials are compensated for.

The present sealing shell 101 comprises a mixture of TPE-O with natural rubber (NR). In this arrangement the natural rubber content varies between 15% and 40%. In order to determine the force F with which the plastic carrier 103 is pressed against the sealing shell 101, two plastic carriers 103 with the two extreme values of the tolerance range are selected. In each case the force is determined that is necessary to obtain a closed contour, wherein no foaming-over takes place. Thereafter the higher value relating to F is used.

In a second alternative (not shown) the venting pot 117 does not comprise a membrane. However, apertures comprising a diameter of 0.01 mm are arranged in the sealing shell 101. Thus the air can escape from the closed cavity 111 by way of these perforations.

In a third alternative a semi-permeable membrane 121 is arranged in the sealing shell 101. In this case the function is as described above, wherein air escapes by way of the membrane arranged in the sealing shell 101.

In a fourth alternative the cavity 111 is not closed by way of a plastic carrier 103 but instead by way of a further (second) tool half, in which a second sealing shell is arranged. Thus mold parts are created that reproduce the cavity. In this arrangement it is important that likewise a closed contour is ensured, by way of which no foaming-over takes place, while at the same time dissipation of air from the cavity takes place by way of a venting area with a membrane or microperforations.

Spray skins are also produced with the present sealing shell 101. The sealing shells 101 used for this comprise a positive grain pattern which has already been imparted to the sealing shells 101 during injection molding at the time of manufacture. Correspondingly, the spray skin subsequently produced from it has the desired surface.

The shell is introduced into a tool carrier as described above. Again no release agents are needed in the production process because the sealing shell already comprises a separating effect that is intrinsic in the material.

In order to produce the spray skins two components are mixed in a mixing nozzle and are sprayed onto the sealing shell by means of robots. Thus spray skins of desired thicknesses can be produced.

In a further alternative the present sealing shells are also used in the manufacture of epoxy resin components, for example skis, surf equipment, or parts for boats.

Correspondingly the epoxy resin and the corresponding matrices, for example glass fiber mats, are placed in the sealing shell.

LIST OF REFERENCE CHARACTERS

101 Sealing shell
103 Plastic carrier
105 Plastic carrier edge
107 Contact edge of the sealing shell
109 Tool carrier half
111 Closed cavity
113 Vacuum perforations
114 Tool holder cavity
115 Vacuum pump
117 Venting pot
119 Sealing lip
121 Membrane
123 Vent hole
125 Coating layer

The invention claimed is:

1. A method for producing a foam-mold part comprising the steps of:
   providing a sealing shell for partially bounding and for sealing a cavity, the sealing shell comprising a foam mold side and a tool carrier side, wherein the sealing shell is made of a material that is compressed when the cavity is closed and the sealing shell is manufactured from a material comprising a polyolefin;
   introducing the sealing shell into a tool carrier half, wherein a receiving device of the tool carrier half comprises vacuum perforations;
   forming, via the sealing shell, a large surface, three-dimensional delimitation for a foam introduced into the cavity;
   affixing the sealing shell in the tool carrier half with a vacuum generated by a vacuum pump through the vacuum perforations in the tool carrier half;
   and in order to form a sealed cavity;
   pressing a counterpart of the sealing shell onto the sealing shell, and, before or after pressing-on;
   introducing a foam into the cavity so that the sealed cavity forms and the foam introduced into the cavity expands only within the cavity;
   wherein the forming and expanding comprises the steps of;
   applying a polyurethane-based coating to the sealing shell on a cavity side before producing the foam-molded part;
   introducing the foam into the cavity;
   pressing a plastic carrier at a defined force F into the sealing shell, thereby elastically deforming a contact edge of the sealing shell with a contact edge of the plastic carrier;
   forming a contact contour at a plurality of contact points by this process;
   expanding the previously introduced foam in the cavity;
   imparting a shape of the cavity to the foam during a foaming of the previously introduced foam;
   de-molding the foam-molded part comprising the plastic carrier, the foamed foam and the coated coating after completion of the foaming and without the use of a release agent.

* * * * *